(12) United States Patent
Ruiken et al.

(10) Patent No.: US 12,544,927 B2
(45) Date of Patent: Feb. 10, 2026

(54) METHOD AND CONTROL UNIT FOR CONTROLLING MOTION OF AN OBJECT TOWARDS A TARGET POSE, AND ROBOT

(71) Applicant: Honda Motor Co., Ltd., Tokyo (JP)

(72) Inventors: Dirk Ruiken, Offenbach (DE); Simon Manschitz, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 18/343,748

(22) Filed: Jun. 29, 2023

(65) Prior Publication Data

US 2025/0001602 A1    Jan. 2, 2025

(51) Int. Cl.
*B25J 9/16*    (2006.01)
*B25J 13/08*    (2006.01)

(52) U.S. Cl.
CPC ........... *B25J 9/1666* (2013.01); *B25J 9/1689* (2013.01); *B25J 13/089* (2013.01)

(58) Field of Classification Search
CPC ...... B25J 9/1666; B25J 9/1689; B25J 9/1633; B25J 9/1679; B25J 9/161; B25J 13/089
See application file for complete search history.

(56) References Cited

U.S. PATENT DOCUMENTS

| | | | |
|---|---|---|---|
| 9,724,826 B1 * | 8/2017 | Prats | B25J 9/1664 |
| 2016/0257000 A1 * | 9/2016 | Guerin | B25J 9/1671 |
| 2018/0088538 A1 * | 3/2018 | Tian | G05B 23/0297 |
| 2021/0183541 A1 * | 6/2021 | Mitchell | H01B 13/01209 |
| 2022/0250240 A1 * | 8/2022 | Gaydarov | B25J 9/0045 |
| 2022/0314437 A1 | 10/2022 | Gienger | |
| 2022/0314443 A1 | 10/2022 | Gienger | |
| 2022/0314446 A1 | 10/2022 | Gienger | |
| 2024/0091951 A1 * | 3/2024 | Chavan Dafle | G06T 7/73 |

OTHER PUBLICATIONS

Charles Schaff et al., "Residual Policy Learning for Shared Autonomy", Robotics: Science and Systems 2020, Jul. 10, 2020, pp. 1-10.
Siddharth Reddy et al., "Shared Autonomy via Deep Reinforcement Learning", Robotics: Science and Systems 2018, May 23, 2018, pp. 1-10.

(Continued)

*Primary Examiner* — Dalena Tran
(74) *Attorney, Agent, or Firm* — JCIPRNET

(57) ABSTRACT

The disclosure relates to a method for controlling motion of an object towards a target pose. The method includes determining a current state of the object; randomizing multiple configurations of the object with regard to the current state of the object; predicting for each configuration of the multiple configurations of the object a constraint cost with regard to each constraint of one or more constraints; determining for each constraint of the one or more constraints, among the predicted constraints costs that have been predicted for the multiple configurations of the object, a predicted constraint cost that meets the constraint the worst; predicting a target configuration of the object using the multiple configurations of the object, the one or more determined constraint costs that have been determined for the one or more constraints, and the target pose; and controlling the object to change its current state towards the predicted target configuration.

20 Claims, 11 Drawing Sheets

(56) References Cited

OTHER PUBLICATIONS

Katharina Muelling et al., "Autonomy Infused Teleoperation with Application to BCI Manipulation", Autonomous Robots, Feb. 13, 2017, pp. 1-10, vol. 41.

Ferdinando Fioretto et al., "Lagrangian Duality for Constrained Deep Learning", Machine Learning and Knowledge Discovery in Databases. Applied Data Science and Demo Track, Apr. 6, 2020, pp. 1-19.

Yuqing Du et al., "AvE: Assistance via Empowerment", arXiv, Jan. 7, 2021, pp. 1-12.

* cited by examiner setting the one or more constraints according to a task to be performed by the object ← S51

FIG. 5a selecting, according to a task to be performed by the object, the one or more constraints from a plurality of constraints ← S52

FIG. 5b

S15 predicting the target configuration of the object using the multiple configurations of the object, the one or more determined constraint costs that have been determined for the one or more constraints, and the target pose

S71 using a neural network that predicts the target configuration based on the multiple configurations of the object, the one or more determined constraint costs that have been determined for the one or more constraints, and the target pose

FIG. 7

METHOD AND CONTROL UNIT FOR CONTROLLING MOTION OF AN OBJECT TOWARDS A TARGET POSE, AND ROBOT

TECHNICAL FIELD

The disclosure relates to the field of controlling motion of an object, such as a robot or virtual avatar. In particular, a method for controlling motion of an object towards a target pose, a corresponding control unit, a corresponding program comprising program code, a corresponding non-transitory computer readable storage medium, and a robot comprising the control unit are proposed.

BACKGROUND

Document US 20220314443A1 discloses controlling a robot based on constraint-consistent and sequence-optimized pose adaptation. Document US 20220314446A1 discloses controlling a robot using predictive decision making. Document US 20220314437A1 discloses simulating task performance of virtual characters.

In the context of controlling motion of an object, such as a robot or virtual avatar, a motion manifold describes the potential directions in which the object (may be referred to as end-effector) can move. In general, the Cartesian movement of an end-effector may be described by a 6-dimensional vector. Three dimensions describe the change of the end-effector's position (e.g., x-y-z coordinates) and the remaining three dimensions describe the change of the orientation (e.g., by using Euler angles). While an end-effector can in theory move in any direction, an object configuration, such as the configuration of a robot may also lead to some movement directions being blocked. For instance, a movement may be constrained by the object's hardware limitations (e.g., joint limits), by the environment (e.g., collision with an obstacle) or by the current task (e.g., the end-effector's orientation is constrained because it holds a glass filled with water).

For controlling movement of the end-effector, the end-effector may move towards a target pose, wherein the target pose may be controlled, e.g., by a human operator. For example, in a scenario of a teleoperated robotic system, the robot end-effector may chase or follow a target pose that may be commanded by a human operator. For instance, the operator may wear a head mounted display (HMD) and may see the robot in a virtual-reality (VR) environment. In this scenario, the operator may move a target pose with a controller. The task of the robot controller may be to move the end-effector to this target pose.

An inverse kinematics (IK) controller may be utilized for computing commands which will move the end-effector closer to the target pose. However, if not every intermediate pose on the way to the target pose (including the target pose itself) is feasible, the target pose cannot be reached by the end-effector.

In typical setups for controlling motion of an object, such as a robot or virtual avatar, motion planning algorithms may be utilized for generating feasible trajectories leading to a target pose. The target pose itself may be made feasible with optimization algorithms. In scenarios such as a teleoperated control of the object, the aforementioned methods cannot be used because they are too slow and cannot be used in real-time.

SUMMARY

In the first aspect, the method for controlling motion of an object towards a target pose, comprises determining a current state of the object; and randomizing multiple configurations of the object with regard to the current state of the object. The method further comprises predicting for each configuration of the multiple configurations of the object a constraint cost with regard to each constraint of one or more constraints. Furthermore, the method comprises determining for each constraint of the one or more constraints, among the predicted constraints costs that have been predicted for the multiple configurations of the object, a predicted constraint cost that meets the constraint the worst. Moreover, the method comprises predicting a target configuration of the object using the multiple configurations of the object, the one or more determined constraint costs that have been determined for the one or more constraints, and the target pose. The method comprises controlling the object to change its current state towards the predicted target configuration. The terms "meeting a constraint" and "fulfilling a constraint" may be used as synonyms.

The control unit according to the second aspect for controlling motion of an object towards a target pose is configured to determine a current state of the object; and randomize multiple configurations of the object with regard to the current state of the object. The control unit is configured predict for each configuration of the multiple configurations of the object a constraint cost with regard to each constraint of one or more constraints. The control unit is configured to determine for each constraint of the one or more constraints, among the predicted constraints costs that have been predicted for the multiple configurations of the object, a predicted constraint cost that meets the constraint the worst. The control unit is configured to predict a target configuration of the object using the multiple configurations of the object, the one or more determined constraint costs that have been determined for the one or more constraints, and the target pose. The control unit is configured to control the object to change its current state towards the predicted target configuration.

A robot according to the third aspect comprises a control unit, wherein the control unit is configured to control motion of the robot towards a target pose by determining a current state of the robot; randomizing multiple configurations of the robot with regard to the current state of the robot; predicting for each configuration of the multiple configurations of the robot a constraint cost with regard to each constraint of one or more constraints; determining for each constraint of the one or more constraints, among the predicted constraints costs that have been predicted for the multiple configurations of the robot, a predicted constraint cost that meets the constraint the worst; predicting a target configuration of the robot using the multiple configurations of the robot, the one or more determined constraint costs that have been determined for the one or more constraints, and the target pose; and controlling the robot to change its current state towards the predicted target configuration.

The program according to the fourth aspect comprises program-code means for executing a method for controlling motion of an object towards a target pose, when the program is executed on a computer or digital signal processor. The method comprises determining a current state of the object; and randomizing multiple configurations of the object with regard to the current state of the object. The method comprises predicting for each configuration of the multiple configurations of the object a constraint cost with regard to each constraint of one or more constraints. The method comprises determining for each constraint of the one or more constraints, among the predicted constraints costs that have been predicted for the multiple configurations of the object, a predicted constraint cost that meets the constraint the worst. The method comprises predicting a target configuration of the object using the multiple configurations of the object, the one or more determined constraint costs that have been determined for the one or more constraints, and the target pose. The method comprises controlling the object to change its current state towards the predicted target configuration.

The non-transitory computer-readable storage medium according to the fifth aspect embodies a program of machine-readable instructions executable by a digital processing apparatus, which cause the digital processing apparatus to perform a method for controlling motion of an object towards a target pose. The method comprises determining a current state of the object; and randomizing multiple configurations of the object with regard to the current state of the object. The method comprises predicting for each configuration of the multiple configurations of the object a constraint cost with regard to each constraint of one or more constraints. The method comprises determining for each constraint of the one or more constraints, among the predicted constraints costs that have been predicted for the multiple configurations of the object, a predicted constraint cost that meets the constraint the worst. The method comprises predicting a target configuration of the object using the multiple configurations of the object, the one or more determined constraint costs that have been determined for the one or more constraints, and the target pose. The method comprises controlling the object to change its current state towards the predicted target configuration.

BRIEF DESCRIPTION OF THE DRAWINGS

The description of embodiments refers to the enclosed figures, in which

FIGS. 5a and 5b each show an example of an optional step of the method according to an embodiment;

FIGS. 6 and 7 each show an example of an implementation form of a step of the method according to an embodiment;

FIGS. 9a and 9b each show examples of a respective optional constraint of the one or more constraints of FIG. 8a;

In the figures, corresponding elements have the same reference signs. The discussion of same reference signs in different figures is omitted where possible without adversely affecting comprehensibility.

DETAILED DESCRIPTION

Figure 1:
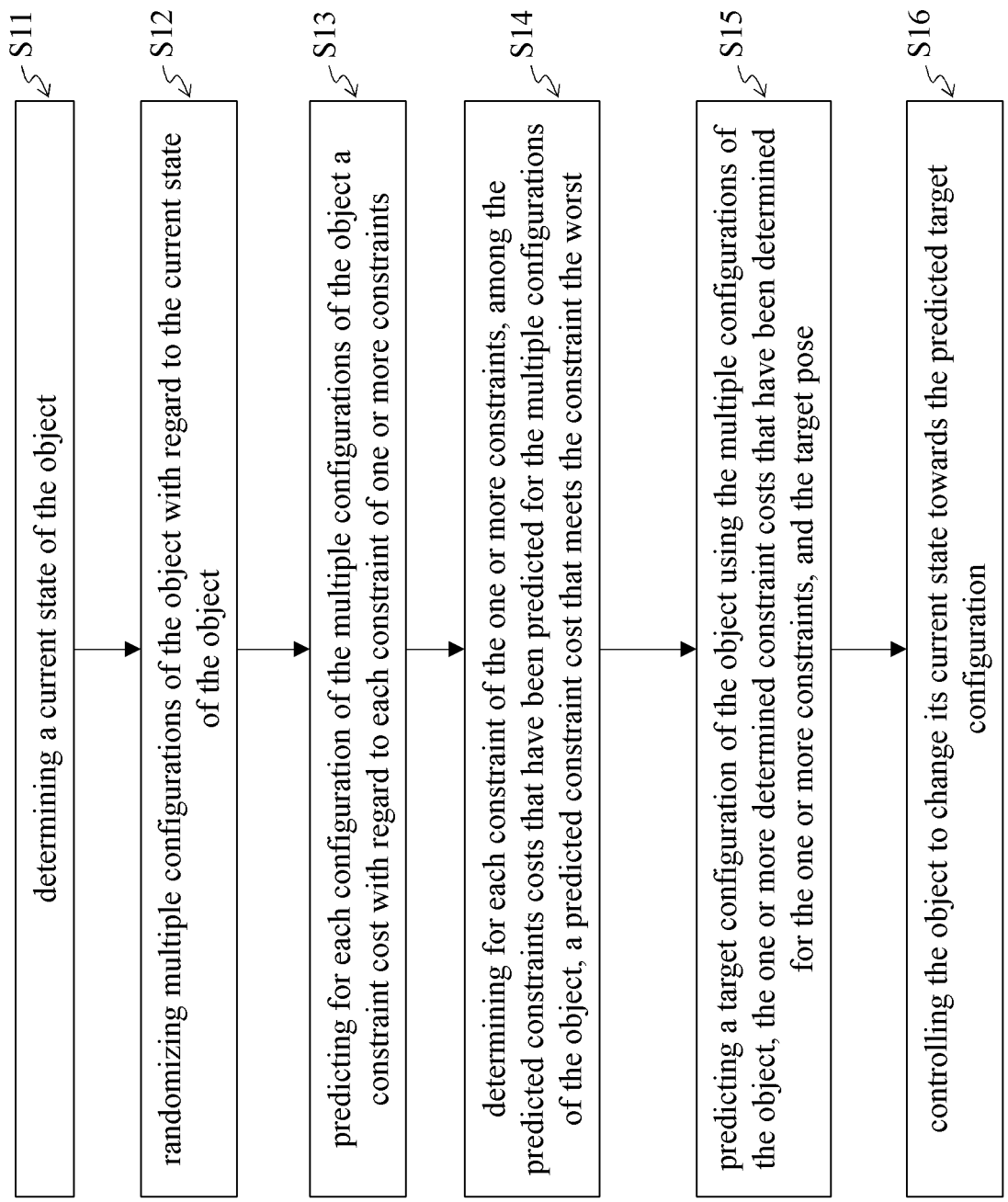
FIG. 1 shows a simplified flowchart of a method according to an embodiment.

The method according to the first aspect provides an advantageous solution to the aforementioned problem. The control unit according to the second aspect, the robot according to the third aspect, the program according to the fourth aspect, and the non-transitory computer-readable storage medium according to the fifth aspect provide further advantageous solutions to the problem. The dependent aspects define further advantageous embodiments of the disclosure.

The method according to the first aspect may be a computer-implemented method. That is, the method may be performed by a processing unit, such as a computer. The method may be performed with regard to multiple constraints. The terms "two or more" and "multiple" may be used as synonyms.

The object may comprise one or more joints. The object may be a robot or a virtual avatar. The target pose may be controlled by an operator via teleoperation. The target configuration may define a movement direction and pose of the object. The object may be referred to as "end-effector".

The current state of the object may comprise the current configuration of the object. For example, the current configuration of the object may comprise the value(s) of the one or more joints of the object and/or a current pose of the object. Optionally, the current configuration of the object may comprise a current movement direction of the object. The current pose of the object may comprise the current position of the object and/or the current orientation of the object. For example, the current pose of the object may be a six dimensional pose (6D pose), wherein three dimensions describe the object's position (e.g., by using x-y-z coordinates) and the remaining three dimensions describe the object's orientation (e.g., by using Euler angles). The current state of the object may comprise the current position and/or current orientation of the object. The current state of the object may comprise a current movement of the object, such as current direction of movement, current speed etc. For example, the current state of the object may comprise the current movement, e.g., the current Cartesian movement, of the object in the form of a 6-dimensional vector. Three dimensions may describe the current change of the object's position (e.g., by using x-y-z coordinates) and the remaining three dimensions may describe the current change of the orientation (e.g., by using Euler angles). The current state of the object may be understood as the state of the object that is determined at a time step or point in time at which the method is performed for controlling motion of the object.

The term target pose may be understood as a pose of the object that the object should reach. In other words, the target pose may be understood as a pose of the object that the object shall reach at the end of a movement. The target pose may describe a position and orientation of the object that the object shall reach. The target configuration of the object may be understood as the configuration of the object that the object is to achieve. The steps of the method may be performed at repeating time steps. Assuming that the target pose does not change, multiple target configurations of the object may be predicted during the repeating time steps, wherein with each repetition of the method the target configuration will be closer or more similar to the target pose of the object. At one time step of the repeating time steps at which the method may be performed, the predicted target configuration may match or be closest to the target pose within the boundaries set by the one or more constraints. At this time step, it may be said that the object has reached the target pose.

For example, the object may be a robot arm and the target pose may be represented by a pose of a hand that is controlled (e.g., via teleoperation) by an operator. In this case, the method allows to control the motion of the robot arm towards the pose of the hand. That is, the part of the robot arm corresponding to the hand may achieve the pose of the hand, i.e., the target pose. For this, the method allows predicting using the target pose a target configuration of the robot arm and controlling the robot arm to change its current state towards the predicted target configuration. For predicting the target configuration, the one or more constraints, such as joint limits of the robot arm, are considered in the step of predicting for each configuration a constraint cost, the step of determining for each constraint a predicted constraints costs that meets the constraint the worst, and the step of predicting the target configuration. As a result, it is ensured that the target configuration is predicted such that the target configuration is feasible. That is, the target configuration may be achieved by the robot arm.

By repeatedly performing the steps of the method, the robot arm may at one point in time be controlled to change its current state (at the respective time step of performing the method) to the predicted target configuration that matches or is closest to the target pose (i.e., the pose of the hand controlled by the operator) within the boundaries that are set by the one or more configurations. As outlined above, since in the steps of predicting for each configuration a constraint cost, determining for each constraint a predicted constraints costs that meets the constraint the worst and predicting the target configuration the one or more constraints are considered, the robot arm will be controlled to achieve the target pose in a way that is feasible. The aforementioned description with regard to the object being a robot arm is correspondingly valid for any other type of object.

Since the target pose is considered at the step of predicting the target configuration it is sufficient to repeat the steps of predicting the target configuration and controlling the object to change its current state in case the target pose changes assuming that the one or more constraints do not change. This reduces the processing time for performing the method at each time step and, thus, supports a real-time control of the motion of the object. Moreover, due to the multiple configurations that are used for predicting the target configuration an operator that may control the target pose may control motion of the object towards the target pose within a space covered by the multiple configurations without a perceived delay. The multiple configurations, i.e., this manifold, allow low latency (e.g., may be greater than 100 Hz) updates of the target pose and, thus, updates of the target configuration (assuming the method is performed at repeating time steps). Using the one or more determined constraint costs that have been determined for the one or more constraints for predicting the target configuration ensures that the control of the motion of the object towards the target pose considers the one or more constraints.

The multiple configurations of the object may be randomized such that each of the multiple configurations are in a certain space around the current configuration of the object. For example, the multiple configurations of the object may be randomized such that the position of the object for each of the multiple configurations differs from the current position of the object (for the current configuration) below a threshold. For example, in case the position is described by three dimensions (e.g., x-y-z-coordinates), there may be a respective threshold for each of the three dimensions. The multiple configurations of the object may be randomized such that the orientation of the object for each of the multiple configurations differs from the current orientation of the object (for the current configuration) below a threshold. For example, in case the orientation is described by three dimensions (e.g., Euler angles), there may be a respective threshold for each of the three dimensions. The multiple configurations of the object may be randomized such that the one or more joint values of the object for each of the multiple configurations differs from the one or more current joint values of the object (for the current configuration) below a threshold. Randomizing the multiple configurations of the object with regard to the object's current state may comprise considering a current movement, current speed, current direction of movement etc. for the randomization of the multiple configurations. For example, in case at a current time step the object moves already in a certain direction (towards the target pose), the multiple configurations of the object may be randomized at the current time step such that the multiple configurations are oriented in this direction. Namely, it is likely that for a next time step of performing the method the target pose remains the same and, thus, the direction of movement is desired to remain the same.

A predicted constraint cost that, among the predicted constraints costs that have been predicted for the multiple configurations of the object, meets the constraint the worst may either be a constraint cost that does not fulfill the constraint (i.e., it indicates that the configuration for which it has been predicted does not fulfill the constraint) or it may be a constraint cost that fulfills the constraint (i.e., it indicates that the configuration for which it has been predicted fulfills the constraint), however the worst. The passage "a constraint cost, which has been predicted for a configuration with regard to a constraint, meets the constraint the worst" and the passage "the configuration (for which the aforementioned constraint costs has been predicted) meets the constraint the worst" may be understood as synonyms. The passage "a constraint cost, which has been predicted for a configuration with regard to a constraint, meets the constraint the worst" may mean that the predicted constraint cost indicates that the configuration (for which the predicted constraint cost has been predicted with regard to the constraint) meets the constraint the worst. A configuration that meets the constraint the worst may mean that the configuration does not fulfill the constraint or the configuration fulfills the constraint, however the worst.

Predicting the target configuration of the object, as described above, may comprise determining one or more constraint costs that fulfill the respective constraint, and determining among the determined one or more constraint costs the constraint cost that fulfills the respective constraint the best. Predicting the target configuration of the object may further comprise selecting a configuration among the multiple configurations for which the determined constraint cost has been predicted as the target configuration. Alternatively, in case two or more constraints costs have been determined to fulfill the respective constraint, predicting the target configuration of the object may comprise combining the configurations for which the two or more constraints costs have been predicted to form the target configuration. The aforementioned combining may be done in a weighted way according to the two or more constraint costs. For example, a configuration for which the predicted constraint cost fulfills the respective constraint better may have a greater impact or a greater contribution to the target configuration compared to a second configuration for which the predicted constraint cost fulfills the respective constraint worse.

Predicting the target configuration of the object may be done such that a distance between a position of the object having the target configuration and the target pose is minimized. In other words, the target configuration may be formed or determined using the multiple configurations of the object such that a distance from the target pose to the object when the object's current configuration is changed to the target configuration is minimized.

Controlling the object to change its current state towards the predicted target configuration may mean controlling the object to change its current configuration to the target configuration. For example, the target configuration may comprise or define target value(s) for one or more joints of the object. Controlling the object to change its current state towards the predicted target configuration may comprise controlling the one or more joints to change according to the target value(s) for the one or more joints of the object. The target configuration may comprise or define a desired pose of the object, for example a desired position of the object and/or a desired orientation of the object. Controlling the object to change its current state towards the predicted target configuration may comprise controlling the current position of the object to change to the desired position and/or controlling the current orientation of the object to change to the desired orientation. Controlling the object to change its current state towards the predicted target configuration may comprise generating and providing control command(s) to the object that cause or instruct the object to change its current state towards the predicted target configuration. The control command(s) may comprise object's velocities (e.g., Cartesian velocities), joint limit velocities, or motor torques, depending on the object (e.g., robot in case the object is a robot) and underlying control framework.

According to an embodiment of the method, the step of predicting for each configuration of the multiple configurations of the object the constraint cost with regard to each constraint of the one or more constraints comprises: using a current environmental state around the object for predicting for each configuration of the multiple configurations of the object the constraint cost. The current environmental state may comprise information on at least one of position of one or more obstacles (stationary and/or mobile obstacle(s)) that are present in the environment around the object, characteristics of a surface on which the object moves, one or more safety rules of an area within the object moves, a pose of one or more other objects, and parameters, such as size, type and/or form (e.g., cylindrical, box, etc.), of the one or more other objects.

According to an embodiment of the method, the method is performed with regard to multiple constraints.

According to an embodiment of the method, the step of predicting for each configuration of the multiple configurations of the object the constraint cost with regard to each constraint of the one or more constraints comprises: generating a value for the constraint cost that is smaller than or equal to zero in case the configuration of the object meets the constraint, wherein the smaller the value the more the configuration of the object meets the constraint; and generating a positive value for the constraint cost in case the configuration of the object does not meet the constraint, wherein the greater the positive value the less the configuration of the object meets the constraint.

In other words, in case a constraint cost that has been predicted for a configuration with regard to a constraint is negative or zero (i.e., is smaller than or equal to zero), then the configuration fulfills the constraint. In the aforementioned case, the following is true: The smaller the value of the constraint cost (or the greater the absolute value of the constraint cost) the better the constraint cost (i.e., respective configuration) meets the constraint, and vice versa. In case a constraint cost that has been predicted for a configuration with regard to a constraint is positive (i.e., is greater than zero), then the configuration violates the constraint. In the aforementioned case, the following is true: The greater the positive value of the constraint cost the worse the constraint cost (i.e., respective configuration) meets the constraint, and vice versa. The passages "positive value" and "value that is greater than zero" may be used as synonyms.

According to an embodiment of the method, the step of determining for each constraint of the one or more constraints, among the predicted constraints costs that have been predicted for the multiple configurations of the object, the predicted constraint cost that meets the constraint the worst comprises: determining for each constraint of the one or more constraints, among the predicted constraints costs that have been predicted for the multiple configurations of the object, the predicted constraint cost with the greatest value.

In case the predicted constraint costs each have a negative value, the aforementioned step may comprise determining for the respective constraint, among the predicted constraints costs, the predicted constraint cost with the greatest value, i.e., with the negative value that is closest to zero. In other words, in the aforementioned case the predicted constraint costs indicate that each of the multiple configurations fulfills the constraint (with regard to which the predicted constraint costs have been predicted). The term "greatest value" is to be understood such that positive values are greater than negative values. Among positive values, a first positive value is greater than a second positive value (i.e., pos_value 1>pos_value 2), when the absolute value of the first positive value is greater than the absolute value of the second positive value (i.e., |pos_value 1|>|pos_value 2|). Among negative values, a first negative value is greater than a second negative value (i.e., neg_value 1>neg_value 2), when the absolute value of the first negative value is smaller than the absolute value of the second negative value (i.e., |neg_value 1|<|neg_value 2|). In other words, among negative values, a first negative value is greater than a second negative value (i.e., neg_value 1>neg_value 2), when the first negative value is closer to zero compared to the second negative value.

In other words, for each of the multiple configurations of the object the predicted constraint costs may be aggregated by a maximization function that selects among the constraint costs predicted with regard to a respective constraint of the one or more constraint the predicted constraint cost with the greatest value. Such aggregation is beneficial since it reduces an arbitrary number of constraints into a single value. Since there are multiple configurations of the object, this may lead to a vector of fixed size which may be easily fed into any standard neural network. This allows using a neural network for predicting the target configuration. Due to the aggregation, an arbitrary number of constraints may be handled for predicting the target configuration. The maximization function may be chosen because a configuration is infeasible as soon as a single constraint is violated. Therefore, the maximization function ensures that the largest violation of a constraint (in case the greatest value is positive) or a value closest to a violation of the constraint (in case the greatest value is negative or zero) will be considered for predicting the target configuration.

Optionally, the step of determining for each constraint of the one or more constraints, among the predicted constraints costs that have been predicted for the multiple configurations of the object, the predicted constraint cost that meets the constraint the worst comprises: determining for each constraint of the one or more constraints, among the predicted constraints costs that have been predicted for the multiple configurations of the object, the predicted constraint cost with the greatest positive value.

In other words, for each of the multiple configurations of the object the predicted constraint costs may be aggregated by a maximization function that selects among the constraint costs predicted with regard to a respective constraint of the one or more constraint the predicted constraint cost with the greatest positive value. Such aggregation is beneficial since it reduces an arbitrary number of constraints into a single value. Since there are multiple configurations of the object, this may lead to a vector of fixed size which may be easily fed into any standard neural network. This allows using a neural network for predicting the target configuration. Due to the aggregation, an arbitrary number of constraints may be handled for predicting the target configuration. The maximization function may be chosen because a configuration is infeasible as soon as a single constraint is violated. Therefore, the maximization function ensures that the largest violation of a constraint will be considered for predicting the target configuration.

The method according to an embodiment comprises setting the one or more constraints according to a task to be performed by the object.

The task may be obtained from an operator. At least one constraint of the one or more constraints may be task specific. For example, in case the object is a robot arm and the task is picking up a glass filled with a liquid, a task specific constraint, i.e., a constraint that depends on the task, may be not spilling the liquid when picking up the glass. In the aforementioned example, the target pose may be a hand that grasps the glass. In the aforementioned example, another task specific constraint may be closing the fingers of the robot arm such that it leads to a stable grasp. Other constraints may be due to the hardware of the robot arm, e.g., considering the joint limits, or due to the environment, such as avoiding collision with obstacles that are present in the environment around the robot arm. For example, when the object is a robot arm and the task is placing down a glass or any other object, a task specific constraint may be opening the fingers of the robot arm such that the glass does not fall over as soon as the fingers are open. In the aforementioned example, the target pose may be a hand at a position where the glass is to be placed down. Different tasks and the one or more corresponding constraints may be stored in a look-up table. The setting of the one or more constraints may be done by an operator of the object or automatically by an entity based on a prediction of what the operator is currently trying to achieve.

The method according to an embodiment comprises selecting, according to a task to be performed by the object, the one or more constraints from a plurality of constraints. The selection of the one or more constraints may be done by an operator of the object or automatically by an entity based on a prediction of what the operator is currently trying to achieve.

According to an embodiment of the method, the step of predicting for each configuration of the multiple configurations of the object the constraint cost with regard to each constraint of the one or more constraints comprises: using a neural network for each constraint of the one or more constraints that predicts for each configuration of the multiple configurations of the object the constraint cost with regard to the constraint.

The neural network may be a feedforward neural network (FFNN). That is, for each constraint of the one or more constraints a neural network may be provided, wherein the multiple configurations are provided as inputs to each neural network and the neural network predicts for each configuration of the multiple configurations of the object the constraint cost with regard to the respective constraint. Thus, in case of multiple constraints the constraints costs with regard to the multiple constraints may be computed for each configuration of the multiple configurations independently from each other and in parallel. Namely, for each constraint of the multiple constraints a neural network may be used for predicting for each configuration of the multiple configurations the constraint cost with regard to the constraint. That means for computing the constraints costs (assuming that there are multiple constraints) for a configuration of the multiple configurations of the object no information on the other configuration(s) is needed. That is, for computing the constraints costs (assuming that there are multiple constraints) for a configuration of the multiple configurations of the object no information on the other configuration(s) is used. Optional the current environmental state around the object may be provided as an input to the neural network in addition to the multiple configurations. The one or more neural networks used for the one or more constraint may be referred to as "constraint cost predictor(s)" or "predictor(s)". In case of multiple constraints, the neural networks may be trained independent from each other.

A neural network for predicting for a configuration a constraint cost with regard to a constraint may be trained using a training data set of a plurality of training data entries, wherein each training data entry comprises a configuration of the object and optionally an environmental state around the object as input data in association with a constraint cost with regard to the constraint. For example, in case the constraint is avoiding a collision with an obstacle, the constraint cost of a training data entry may be computed for the configuration of the object and the optional environmental state of the training data entry. The configuration of the object may comprise the value(s) of the one or more joints of the object and/or a pose of the object. The pose of the object may comprise the position of the object and/or the orientation of the object. The environmental state may comprise information on at least one of position of one or more obstacles (stationary and/or mobile obstacle(s)) that are present in the environment around the object, characteristics of a surface on which the object moves, one or more safety rules of an area within the object moves, a pose of one or more other objects, and parameters, such as size, type and/or form (e.g., cylindrical, box, etc.), of the one or more other objects.

Thus, training a neural network for predicting for a configuration a constraint cost with regard to a constraint may comprise computing for the input data (i.e., the configuration of the object and optionally the environmental state) of each training data entry of the training data set the constraint cost with regard to the constraint, and train the neural network to predict those computed constraint costs given the input data. Since one neural network may be trained for every constraint, the structure of each neural network (e.g., number and type of layers) may differ from each other. The neural network may be referred to as "neural network model". The task of each neural network model is to predict for the multiple configurations of the object, optionally using the current environmental state around the object, the current constraint costs with regard to the respective constraint.

A value of a constraint cost may be any real number. A constraint is considered to be violated (i.e., not fulfilled) in case the constraint cost is greater than zero. As a loss function for training a neural network a binary cross entropy loss may be used. This means the neural network may be trained to predict whether the respective constraint is fulfilled or not (i.e., violated). Thus, during training of the neural network, the neural network model may be converted into a binary classifier by transforming its output for a respective configuration into a value between 0 and 1. Here, a value larger than 0.5 indicates a constraint violation. When performing the method and using the neural network for predicting for each configuration of the object a constraint cost with regard to a respective constraint (i.e., predicting whether the configuration fulfills or violates the respective constraint), the predicted constraint costs (not the mere classification results) are output by the neural network and used for predicting the target configuration of the object. The constraint costs may be more informative compared to the classification results because they not only indicate whether a configuration of the object violates or fulfils a respective constraint, but they also indicate the extend by which the configuration of the object violates or fulfils the respective constraint, respectively.

According to an embodiment of the method, the step of predicting the target configuration of the object using the multiple configurations of the object, the one or more determined constraint costs that have been determined for the one or more constraints, and the target pose comprises: using a neural network that predicts the target configuration based on the multiple configurations of the object, the one or more determined constraint costs that have been determined for the one or more constraints, and the target pose.

The neural network may be a feedforward neural network (FFNN). The neural network may be based on or implemented using a Lagrangian duality min-max formulation. That is, the multiple configurations of the object, the one or more determined constraint costs that have been determined for the one or more constraints, and the target pose are provided as inputs to the neural network that predicts the target configuration using these inputs. The neural network for predicting the target configuration may be referred to as "target configuration predictor" or "predictor".

The neural network for predicting the target configuration of the object may be trained using a training data set of a plurality of training data entries, wherein each training data entry comprises multiple configurations of the object, one or more determined constraint costs that have been determined for the one or more constraints, and the target pose as input data in association with a target configuration. The target configuration of a respective training data entry fulfills the one or more constraints. The target pose of a training data entry may be randomly generated. The training of the neural network may be performed using a simulation, e.g., a computer simulation. For generating the multiple configurations of the object and the one or more determined constraint costs of the training data entries a second data set of a plurality of second training data entries, wherein each second training data entry comprises a configuration of the object and optionally an environmental state around the object may be input to one or more neural networks each for predicting for a configuration a constraint cost with regard to a constraint. These one or more neural networks may have been trained as outlined above.

During the training, the neural network for predicting the target configuration takes for the input data of a training data entry a decision on the target configuration of the object. Optionally, such generated target configuration may be compared to the target configuration of the training data entry. Using for example a loss function the decision of the neural network with regard to the target configuration of the training data entry may be optimized.

Optionally, the one or more neural networks each for predicting for a configuration a constraint cost with regard to a constraint may be used to predict, whether for the new configuration of the object (indicated by or equaling the target configuration) the one or more constraints are fulfilled or not. For example, using a loss function the neural network for predicting the target configuration may be punished in case it has taken a bad decision. It may have taken a bad decision e.g., when the one or more constraints for the initial configuration were fulfilled, but the one or more constraints are violated for the new configuration of the object. Using the loss function the neural network for predicting the target configuration may be rewarded in case it has taken a good decision. It may have taken a good decision e.g., when the new configuration does not violate or does not anymore violate the one or more constraints and the new configuration is closer to the target pose compared to the initial configuration. Real life data may be used for generating constraint data that may be difficult to be simulated, such as sensor data (e.g., measured forces and the like).

Training the neural network for predicting the target configuration comprises minimizing a loss term (measuring a distance between a current configuration of the object and the target pose) and considering one or more constraints such that the one or more constraints are fulfilled (e.g., the constraint costs for each of the one or more constraints are to be smaller or equal to zero). For this, the neural network may be trained using a Lagrangian duality min-max formulation for describing the one or more constraints.

This uses a loss function $L(w, \lambda)$ which has two parts:

$$L(w,\lambda)=c\_pose(w)+\lambda c\_constraints(w), \text{ wherein}$$

the part "c_pose" describes the target pose loss and the part "c_constraints" describes the constraint costs term. $\lambda$ is the Lagrange multiplier which weights the two loss terms. The parameters of the neural network are summarized in w.

The optimization problem to be solved during the training may be formulated as:

$$\max_{\lambda} \min_{w} L(w, \lambda)$$

During the training of the neural network for predicting the target configuration two alternating optimization steps may be performed. First, the neural network may be optimized such that the loss is minimized (inner part of optimization problem). That means the parameters of the neural network are adjusted such that the overall loss is becoming smaller. Next, a second optimizer is directed to maximize the loss by adjusting $\lambda$. This optimization scheme works because when the one or more constraints are not satisfied, the second term (c_constraints) is positive, which means A becomes larger. The consequence is that the second term becomes more important in the overall loss function, which is why over time the neural network will more likely predict target configurations of the objects, which not only minimize the target pose loss but also consider the constraint costs. As soon as the neural network produces an output which satisfies the one or more constraints, the second term (c_constraints) will become negative. In order to further maximize the loss function, the optimizer therefore may decrease $\lambda$ until it reaches zero. If the overall optimization is finished, the neural network for predicting the target configuration may have the ability of generating target configurations which minimize the target pose loss and at the same time produce constraint-free target configuration (i.e., the one or more constraints are fulfilled). The optimization scheme may work when $\lambda \geq 0$. To enforce this, $\lambda$ may be fed into a softplus function when computing the loss function. Even if $\lambda$ is negative, softplus$(\lambda) \geq 0$ holds.

According to an embodiment of the method, the target pose is controlled by an operator via teleoperation.

The target pose mays be controlled by the operator (e.g., via teleoperation), wherein in case the operator changes the target pose, the steps of predicting the target configuration of the object and controlling the object to change its current state towards the predicted target configuration may be performed using the changed target pose. That is, an update of the target pose may trigger performing the aforementioned steps of the method.

A change (may be referred to as update) of the one or more constraints may trigger performing the method of the first aspect using the changed one or more constraints.

According to an embodiment of the method, the one or more constraints comprise at least one of one or more constraints due to a hardware of the object, one or more constraints due to a task to be performed by the object, and one or more constraints due to an environment around the object.

According to an embodiment of the method, the one or more constraints due to the hardware of the object comprise at least one of considering one or more joint limits of the object, considering one or more speed limits of the object, considering one or more energy consumption limits of the object, and considering reachability of the object.

According to an embodiment of the method, the one or more constraints due to the environment around the object comprise at least one of avoiding collision with one or more obstacles, considering one or more characteristics of a surface on which the object moves, and meeting one or more safety rules of an area within the object moves.

According to an embodiment of the method, the one or more constraints comprise at least one of one or more constant constraints and one or more dynamic constraints. Constraints due to the hardware of the object may be an example of constant constraints. Avoiding a collision with one or more obstacles may be an example of dynamic constraints, because the obstacles may move.

According to an embodiment of the method, the steps of the method are performed at repeating time steps. The repeating time steps may be periodically repeating time steps.

According to an embodiment of the method, the object is a robot or a virtual avatar.

In order to achieve the method according to the first aspect, some or all of embodiments and optional features of the first aspect, as described above, may be combined with each other.

The control unit according to the second aspect, the robot according to a third aspect, the program according to a fourth aspect, and the non-transitory computer-readable storage medium according to the fifth aspect provide corresponding advantageous solutions as discussed with regard to the embodiments of the method according to the first aspect. The description of the method of the first aspect is correspondingly valid for the control unit according to a second aspect, the robot according to a third aspect, the program according to a fourth aspect, and the non-transitory computer-readable storage medium according to the fifth aspect.

FIG. 1 shows a simplified flowchart of a method according to an embodiment. The method of FIG. 1 is an example of the method of the first aspect. The description of the method of the first aspect is correspondingly valid for the method of FIG. 1.

The method of FIG. 1 is a method for controlling motion of an object towards a target pose. As shown in FIG. 1, the method comprises, in a step S11, determining a current state of the object. The method comprises, in a step S12 following the step S11, randomizing multiple configurations of the object with regard to the current state of the object. The method comprises, in a step S13 following the step S12, predicting for each configuration of the multiple configurations of the object a constraint cost with regard to each constraint of one or more constraints.

The method comprises, in a step S14 following the step S13, determining for each constraint of the one or more constraints, among the predicted constraints costs that have been predicted for the multiple configurations of the object, a predicted constraint cost that meets the constraint the worst. The method comprises, in a step S15 following the step S14, predicting a target configuration of the object using the multiple configurations of the object, the one or more determined constraint costs that have been determined for the one or more constraints, and the target pose. The method comprises, in a step S16 following the step S15, controlling the object to change its current state towards the predicted target configuration.

The steps of the method may be performed at repeating time steps. That is, the method may be iteratively performed. The repeating time steps may be periodically repeating time steps. In case the target pose is changed, the steps S15 and S16 may be repeated. This allows considering a change of the target pose. The steps S15 and S16 may be performed due to a change of the target pose between the aforementioned optional repeating time steps.

Figure 2:
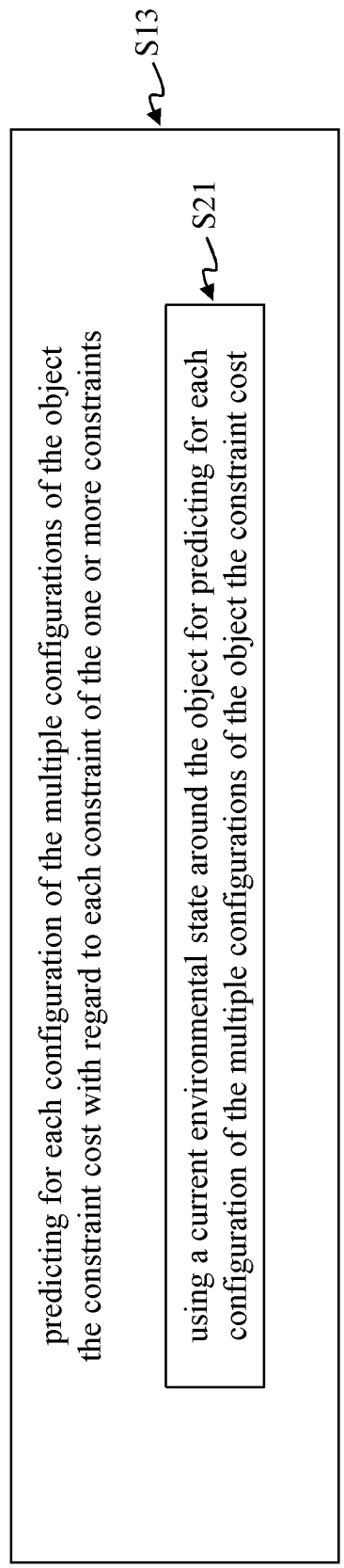
FIGS. 2 to 4 each show an example of an implementation form of a step of the method according to an embodiment.

FIG. 2 shows an example of an implementation form of a step of the method according to an embodiment. Thus, FIG. 2 shows an example of an implementation form of the method of FIG. 1 and, thus, an example of an implementation form of the method of the first aspect. In particular, FIG. 2 shows an example of an implementation form of the step S13 of the method of FIG. 1.

As shown in FIG. 2, the step S13 of predicting for each configuration of the multiple configurations of the object the constraint cost with regard to each constraint of the one or more constraints may comprise: using a current environmental state around the object for predicting for each configuration of the multiple configurations of the object the constraint cost.

Figure 3:
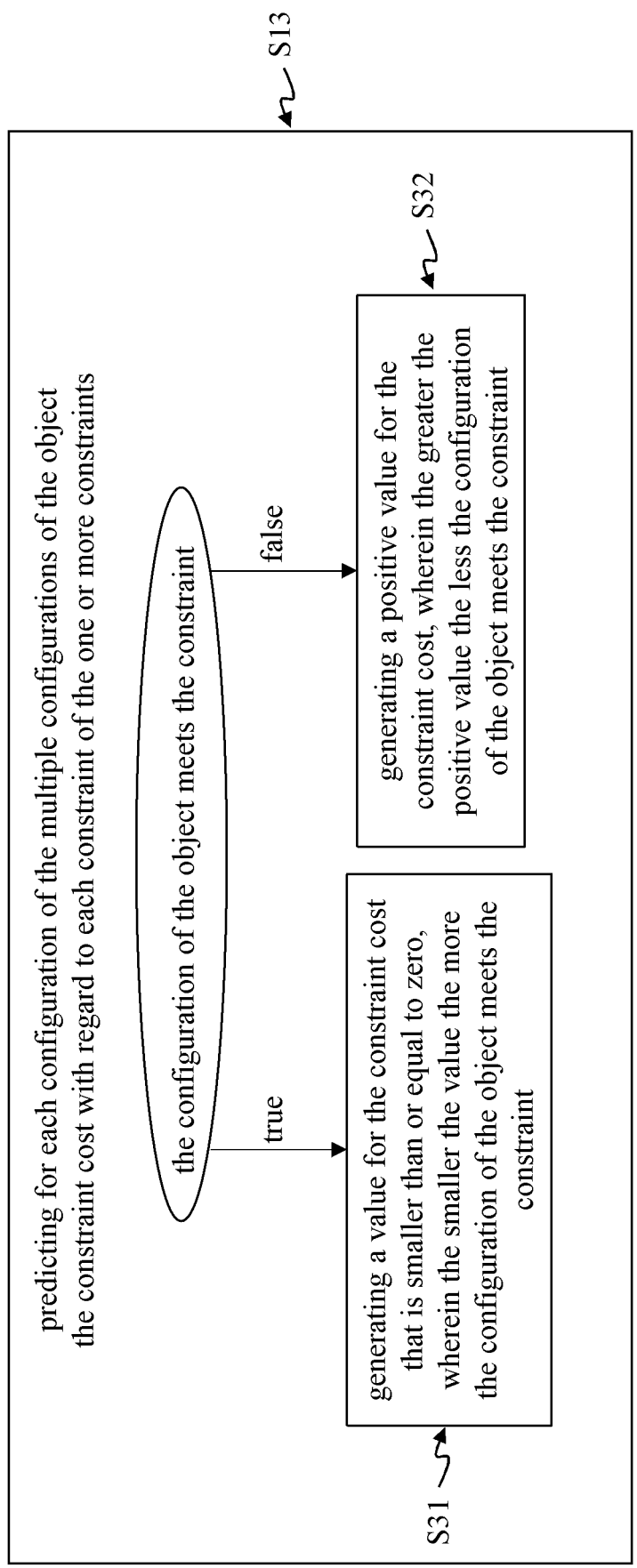

FIG. 3 shows an example of an implementation form of a step of the method according to an embodiment. Thus, FIG. 3 shows an example of an implementation form of the method of FIG. 1 and, thus, an example of an implementation form of the method of the first aspect. In particular, FIG. 3 shows an example of an implementation form of the step S13 of the method of FIG. 1.

As shown in FIG. 3, the step S13 of predicting for each configuration of the multiple configurations of the object the constraint cost with regard to each constraint of the one or more constraints may comprise: the step S31 of generating a value for the constraint cost that is smaller than or equal to zero in case the configuration of the object meets the constraint. The smaller the value (being smaller than or equal to zero) the more the configuration of the object meets the constraint. The step S13 of predicting for each configuration of the multiple configurations of the object the constraint cost with regard to each constraint of the one or more constraints may comprise: the step S32 of generating a positive value for the constraint cost in case the configuration of the object does not meet the constraint. The greater the positive value the less the configuration of the object meets the constraint.

Figure 4:
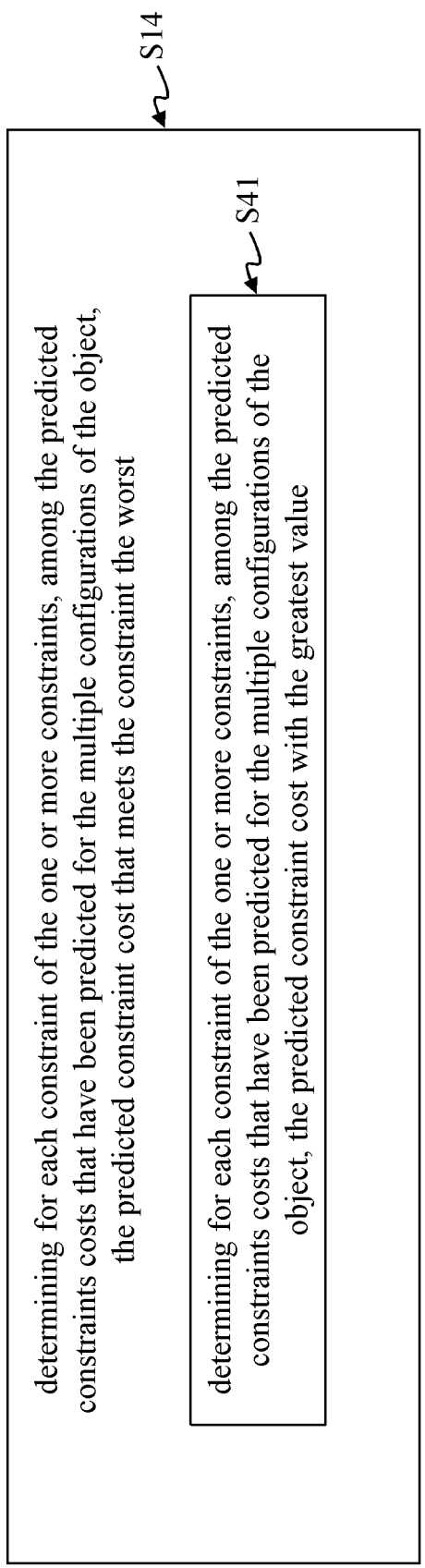

FIG. 4 shows an example of an implementation form of a step of the method according to an embodiment. Thus, FIG. 4 shows an example of an implementation form of the method of FIG. 1 and, thus, an example of an implementation form of the method of the first aspect. In particular, FIG. 4 shows an example of an implementation form of the step S14 of the method of FIG. 1.

As shown in FIG. 4, the step S14 of determining for each constraint of the one or more constraints, among the predicted constraints costs that have been predicted for the multiple configurations of the object, the predicted constraint cost that meets the constraint the worst may comprise: the step S41 of determining for each constraint of the one or more constraints, among the predicted constraints costs that have been predicted for the multiple configurations of the object, the predicted constraint cost with the greatest value. Optionally, the step S41 may comprise (not shown in FIG. 4) determining for each constraint of the one or more constraints, among the predicted constraints costs that have been predicted for the multiple configurations of the object, the predicted constraint cost with the greatest positive value.

FIG. 5a shows an example of an optional step of the method according to an embodiment. Thus, FIG. 5a shows an example of an optional step of the method of FIG. 1 and, thus, an example of an optional step of the method of the first aspect.

As shown in FIG. 5a, the optional step S51 may be setting the one or more constraints according to a task to be performed by the object. The optional step S51 may be performed before the step S11, between the step S11 and the step S12 or between the step S12 and step S13 of the method of FIG. 1.

FIG. 5b shows an example of an optional step of the method according to an embodiment. Thus, FIG. 5b shows an example of an optional step of the method of FIG. 1 and, thus, an example of an optional step of the method of the first aspect.

As shown in FIG. 5b, the optional step S52 may be selecting, according to a task to be performed by the object, the one or more constraints from a plurality of constraints. The optional step S52 of FIG. 5b may be a part of the optional step S51 of FIG. 5a. The optional step S52 may be performed before the step S11, between the step S11 and the step S12 or between the step S12 and step S13 of the method of FIG. 1.

Figure 6:
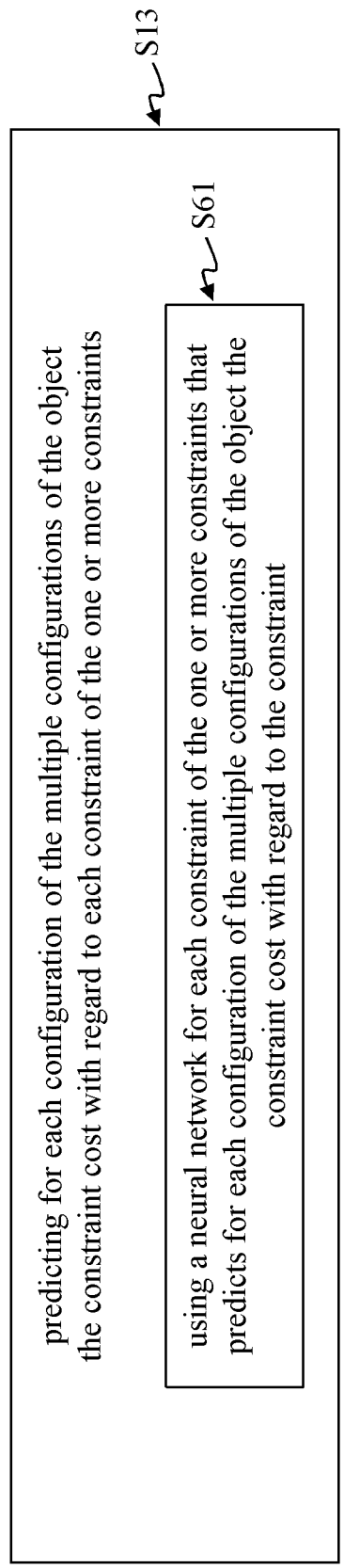

FIG. 6 shows an example of an implementation form of a step of the method according to an embodiment. Thus, FIG. 6 shows an example of an implementation form of the method of FIG. 1 and, thus, an example of an implementation form of the method of the first aspect. In particular, FIG. 6 shows an example of an implementation form of the step S13 of the method of FIG. 1.

As shown in FIG. 6, the step S13 of predicting for each configuration of the multiple configurations of the object the constraint cost with regard to each constraint of the one or more constraints may comprise: using a neural network for each constraint of the one or more constraints that predicts for each configuration of the multiple configurations of the object the constraint cost with regard to the constraint.

The neural network(s) may be trained as outline above in the description of the method of the first aspect.

FIG. 7 shows an example of an implementation form of a step of method according to an embodiment. Thus, FIG. 7 shows an example of an implementation form of the method of FIG. 1 and, thus, an example of an implementation form of the method of the first aspect. In particular, FIG. 7 shows an example of an implementation form of the step S15 of the method of FIG. 1.

As shown in FIG. 7, the step S15 of predicting the target configuration of the object using the multiple configurations of the object, the one or more determined constraint costs that have been determined for the one or more constraints, and the target pose may comprise: using a neural network that predicts the target configuration based on the multiple configurations of the object, the one or more determined constraint costs that have been determined for the one or more constraints, and the target pose.

The neural network may be trained as outline above in the description of the method of the first aspect.

Figure 8A:
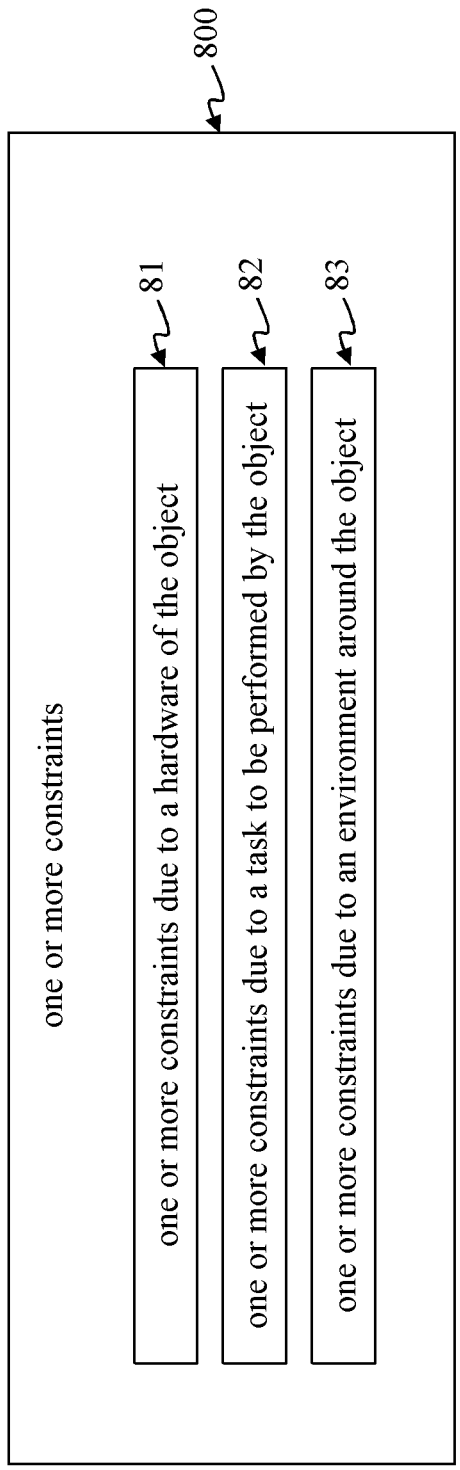
FIGS. 8a and 8b each show examples of one or more constraints that may be used in the method according to an embodiment.

FIG. 8a show examples of one or more constraints that may be used in the method according to an embodiment. Thus, FIG. 8a shows examples of one or more constraints that may be used in the method of FIG. 1 and, thus, in the method of the first aspect.

As shown in FIG. 8a, the one or more constraints 800 may comprise at least one of one or more constraints 81 due to a hardware of the object, one or more constraints 82 due to a task to be performed by the object, and one or more constraints 83 due to an environment around the object.

Figure 8B:
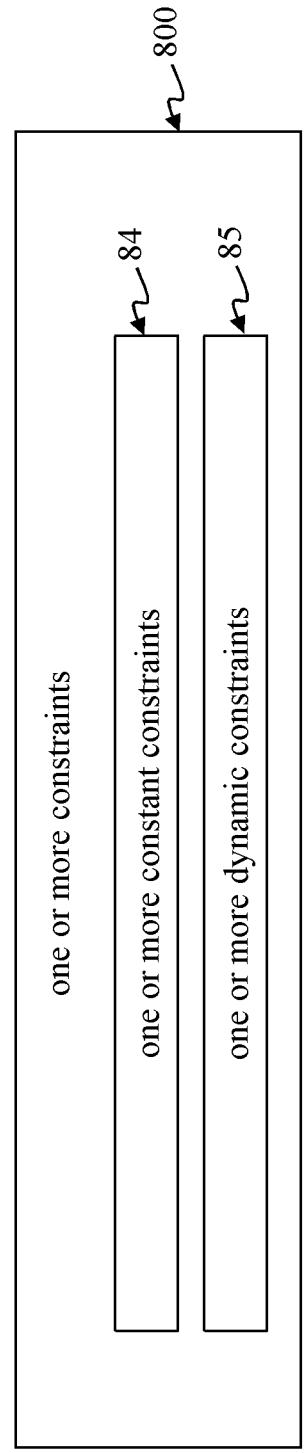

FIG. 8b show examples of one or more constraints that may be used in the method according to an embodiment. Thus, FIG. 8b shows examples of one or more constraints that may be used in the method of FIG. 1 and, thus, in the method of the first aspect.

As shown in FIG. 8b, the one or more constraints 800 may comprise at least one of one or more constant constraints 84 and one or more dynamic constraints 85.

Figure 9A:
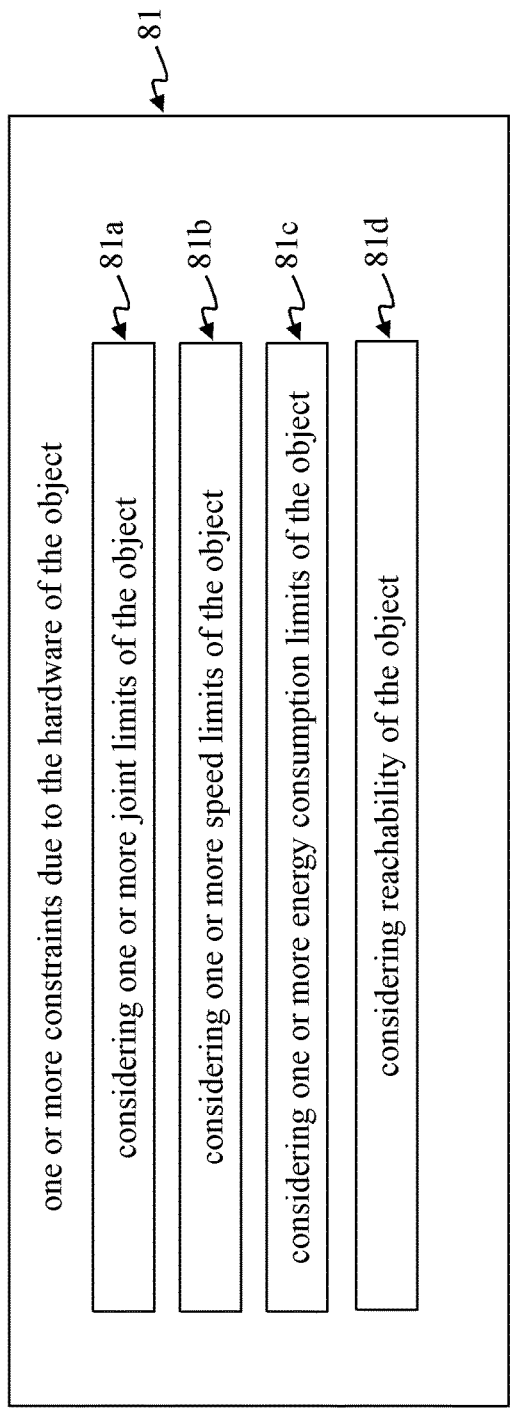

FIG. 9a shows examples of a respective optional constraint of the one or more constraints of FIG. 8a. In particular, FIG. 9a shows examples of the optional one or more constraints due to the hardware of the object.

As shown in FIG. 9a, the one or more constraints 81 due to the hardware of the object may comprise at least one of considering 81a one or more joint limits of the object, considering 81b one or more speed limits of the object, considering 81c one or more energy consumption limits of the object, and considering 81d reachability of the object.

Figure 9B:
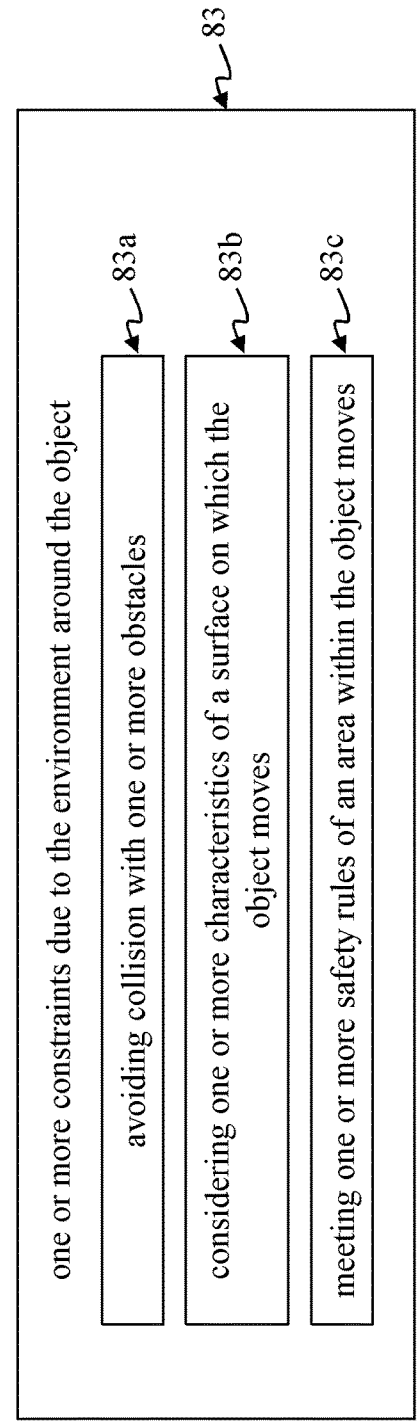

FIG. 9b shows examples of a respective optional constraint of the one or more constraints of FIG. 8a. In particular, FIG. 9b shows examples of the one or more constraints due to the environment around the object.

As shown in FIG. 9b, the one or more constraints 83 due to the environment around the object comprise at least one of avoiding 83a collision with one or more obstacles, considering 83b one or more characteristics of a surface on which the object moves, and meeting 83c one or more safety rules of an area within the object moves.

The optional features of one or more of the FIGS. 2, 3, 4, 5a, 5b, 6, 7, 8a, 8b, 9a and 9b may be combined with the features of FIG. 1 for implementing an example of the method of the first aspect.

Figure 10A:
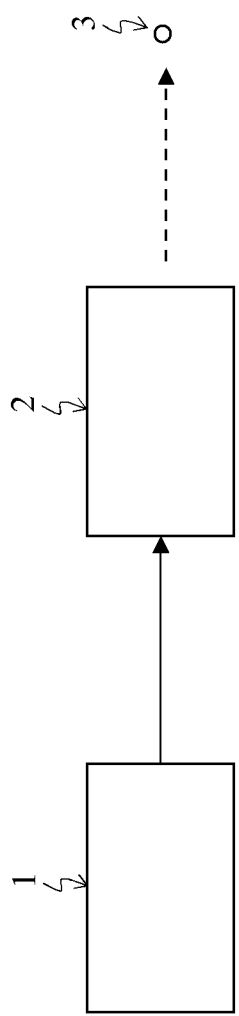
FIG. 10a shows a control unit according to an embodiment.

FIG. 10a shows a control unit according to an embodiment. The control unit is an example of the control unit according to the second aspect. The description of the method of the first aspect is correspondingly valid for the control unit of FIG. 10a.

The control unit 1 of FIG. 10a is a control unit for controlling motion of an object 2 towards a target pose 3.

The control unit 1 is configured to determine a current state of the object 2; and randomize multiple configurations of the object 2 with regard to the current state of the object 2. The control unit 1 is configured to predict for each configuration of the multiple configurations of the object 2 a constraint cost with regard to each constraint of one or more constraints. The control unit 1 is configured to determine for each constraint of the one or more constraints, among the predicted constraints costs that have been predicted for the multiple configurations of the object 2, a predicted constraint cost that meets the constraint the worst. The control unit 1 is configured to predict a target configuration of the object 2 using the multiple configurations of the object 2, the one or more determined constraint costs that have been determined for the one or more constraints, and the target pose 3. The control unit 1 is configured to control the object 2 to change its current state towards the predicted target configuration. Thus, the control unit 1 of FIG. 10a is configured to perform the method of FIG. 1 to control motion of the object 2 towards the target pose 3. The description of the method of FIGS. 1, 2, 3, 4, 5a, 5b, 6, 7, 8a, 8b, 9a and 9b and the description of the method of the first aspect is correspondingly valid for the control unit of FIG. 10a.

The control unit 10a may comprise or may be a controller, microcontroller, processor, microprocessor, application specific integrated circuit (ASIC), field programmable gate array (FPGA) or any combination thereof. The control unit 10a may be a computer.

Figure 10B:
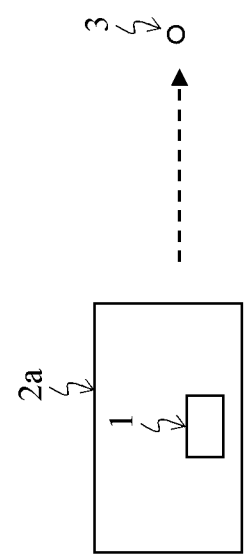
FIG. 10b shows a robot according to an embodiment.

FIG. 10b shows a robot according to an embodiment. The robot is an example of the robot according to the third aspect. The description of the method of the first aspect is correspondingly valid for the robot of FIG. 10b, in particular the control unit of the robot of FIG. 10b.

As shown in FIG. 10b, the robot 2a comprises a control unit 1, wherein the control unit 1 is configured to control motion of the robot 2a towards a target pose 3 by determining a current state of the robot 2a; randomizing multiple configurations of the robot 2a with regard to the current state of the robot 2a; predicting for each configuration of the multiple configurations of the robot 2b a constraint cost with regard to each constraint of one or more constraints; determining for each constraint of the one or more constraints, among the predicted constraints costs that have been predicted for the multiple configurations of the robot 2a, a predicted constraint cost that meets the constraint the worst; predicting a target configuration of the robot 2a using the multiple configurations of the robot 2a, the one or more determined constraint costs that have been determined for the one or more constraints, and the target pose 3; and controlling the robot 2a to change its current state towards the predicted target configuration. Thus, the control unit 1 of FIG. 10b is the control unit 1 of FIG. 10a. The description of the control unit 1 of FIG. 10a is correspondingly valid for the control unit 1 of FIG. 10b. The robot 2a of FIG. 10b is an example of an object 2 that may be controlled by the control unit 1.

The robot 2a may be an industrial robot, a household robot, a service robot (e.g., used at a restaurant), an assistant robot (e.g., used in a hospital, a home for elderly people etc.), a gardening robot, a medicine robot (e.g., used in assisting an operation), etc. The robot 2a may be humanoid robot. The robot 2a may comprise one or more joints. The robot may be a stationary robot (e.g., installed at a location and movable at the location) or a mobile robot (e.g., a robot that may move from one location to another location). The robot 2a may be configured to be teleoperated by an operator (i.e., a human operator). The robot 2a may be configured to move on three or more axes.

For example, the robot 2a may be an articulated robot. An articulated robot looks like a human arm. The term "robotic arm" or "manipulator arm" may be used as synonyms for the term "articulated robot". Alternatively, the robot 2a may be any one of the following a Cartesian coordinate robot, a cylindrical coordinate robot, a spherical coordinate robot, a selective compliance assembly robot arm (SCARA) robot, a delta robot, a serial manipulator and a parallel manipulator.

Figure 11:
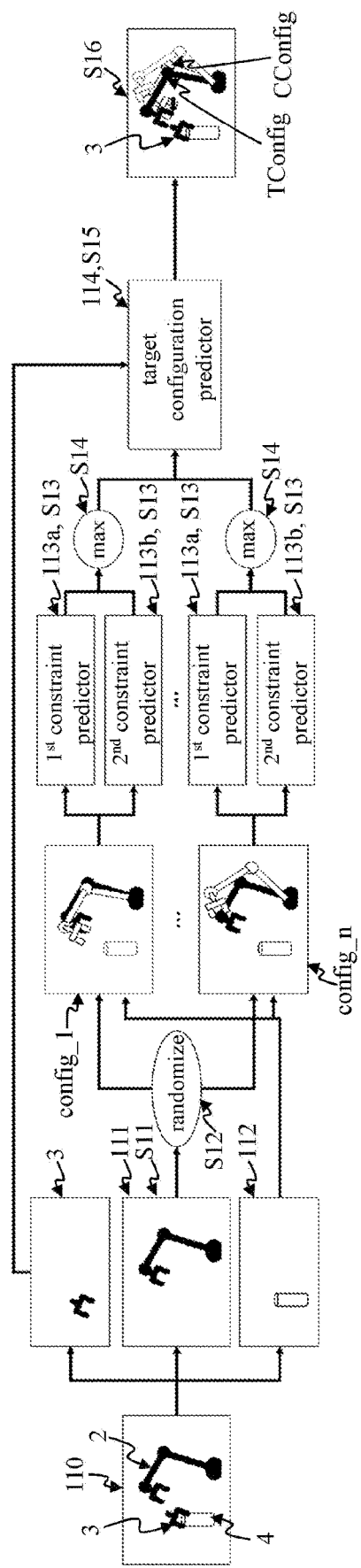
FIG. 11 provides a schematic functional overview of the method according to an embodiment and the control unit according to an embodiment.

FIG. 11 provides a schematic functional overview of the method according to an embodiment and the control unit according to an embodiment. The method of FIG. 11 is an example of the method according to the first aspect. The description of the method according to the first aspect and the description of FIGS. 1, 2, 3, 4, 5a, 5b, 6, 7, 8a, 8b, 9a, and 9b is correspondingly valid for the method of FIG. 11. The control unit of FIG. 11 is an example of the control unit according to the second aspect. The description of the control unit of FIG. 10a is correspondingly valid for the control unit of FIG. 11.

For the example of FIG. 11 it is assumed that the object 2 (of which the motion is to be controlled to a target pose 3) is a robot arm 2, the task is to pick up a cylindrical object 4, and two constraints are to be fulfilled. The target pose 3 is indicated in the form of a hand part of the robot arm 2 that is positioned and orientated for picking up the cylindrical object 4. One constraint may be avoiding a collision of the robot arm 2 with obstacles and a second constraint may be grasping the cylindrical object 4 such that the cylindrical object 4 does not fall over. The number of constraints is only by way of example and may be only one or greater than two. The type of constraints is also only by way of example. There may be additional one or more constraints that are not shown in FIG. 11 and, thus, are not described. For example, another constraint may be due to the hardware of the robot arm 2, such as considering the joint limits of the robot arm 2. The following description of FIG. 11 is correspondingly valid in case of the object to be controlled not being a robot arm 2 and/or the task being different and/or the number of constraints being different and/or the type of constraints being different.

In FIG. 11, the box 110 shows a current state of the robot arm 2 and, thus, a current configuration of the robot arm 2, and a current target pose 3. The target pose 3 may be controlled by an operator (e.g., via teleoperation). The control unit for controlling motion of the robot arm 2 (may be part of the robot or external) may determine the target pose 3, determine S11 the current state of the robot arm 2 and optionally determine the current environmental state 112 around the robot arm 2. The control unit determining information may mean that the control unit obtain the information from another entity and/or obtain itself the information. Next, as shown in FIG. 11, the control unit may randomize S12 multiple configurations of the robot arm 2 (e.g., n configurations, wherein n≥2). In FIG. 11, two examples config_1 and config_n of the multiple configurations of the robot arm 2 are shown.

For each constraint a respective constraint predictor (e.g., in the form of a neural network) may be used for predicting S13 for each configuration of the multiple configurations a constraint costs with regard to the constraint. Thus, there is a first constraint predictor 113a for the first constraint and a second constraint predictor 113b for the second constraint. As indicated in FIG. 11 each constraint predictor 113a or 113b may optionally predict S13 for each configuration the constraint cost with regard to the constraint using the current environmental state 112 around the robot arm 2.

Next, as shown in FIG. 11 by the circles labelled "max", the control unit may determine S14 for each constraint of the constraints, among the predicted constraints costs that have been predicted for the multiple configurations config_1 to config_n of the robot arm 2, a predicted constraint cost that meets the constraint the worst. In the example of FIG. 11, it is assumed that a constraint cost predicted for a configuration that is positive violates the constraint, wherein the greater the positive value of the constraint cost the more the constraint is violated. Further it is assumed that a constraint cost predicted for a configuration that is smaller than or equal to zero fulfills the constraint, wherein the smaller the value (being smaller than or equal to zero) of the constraint cost the more (i.e., better) the constraint is fulfilled.

This aggregation in the step S14 (indicated by the circles labelled "max") is beneficial because it reduces an arbitrary number of constraints into a single value. Since there are multiple configurations of the robot arm 2, this may lead to a vector of fixed size which may be easily fed into any standard neural network. This allows using a neural network as the target configuration predictor for predicting the target configuration. Due to the aggregation, an arbitrary number of constraints may be handled for predicting the target configuration. The maximization function may be chosen because a configuration is infeasible as soon as a single constraint is violated. Therefore, the maximization function ensures that the largest violation of a constraint will be considered for predicting the target configuration.

As shown in FIG. 11, for predicting S15 the target configuration of the robot arm 2 a target configuration predictor 114 (e.g., in the form of a neural network) may be used. The target pose 3 and the constraint costs determined in the step S14 may be input to the target configuration predictor 114. The target configuration predictor 114 may predict S15 the target configuration of the robot arm 2 using the multiple configurations of the robot arm 2, the determined constraint costs (determined in the step S14) and the target pose 3. The multiple configurations of the robot arm 2 may be provided to the target configuration predictor 114. That is, the target configuration predictor 114 may know the multiple configurations of the robot arm 2.

Next the control unit may control the robot arm 2 to change its current state towards the target configuration TConfig. Thus, the control unit may control the robot arm 2 to change it current configuration CConfig to the target configuration TConfig. In the FIG. 11 it is merely assumed by way of example that the target configuration TConfig is the configuration config_1. Alternatively, the target configuration TConfig may be generated such that it is a combination of two or more configurations of the multiple configurations config_1 to config_n, wherein these two or more configurations may be weighted (e.g. by the respective determined constraint cost) and be combined according to the weighting. This may be done by the target configuration predictor 114 such that a distance between the target configuration TConfig and the target pose 3 is minimized and the constraints are fulfilled.

For further details on the schematic functional overview of the method and the control unit of FIG. 11 reference is made to the description of the method according to the first aspect as well as the description of the previous Figures.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude the presence of other elements or steps.

Other Configurations

In a first aspect, the method of the disclosure solves the aforementioned problem. The control unit according to a second aspect, the robot according to a third aspect, the program according to a fourth aspect, and the non-transitory computer-readable storage medium according to a fifth aspect provide further advantageous solutions to the problem.

In the first aspect, the method for controlling motion of an object towards a target pose, comprises determining a current state of the object; and randomizing multiple configurations of the object with regard to the current state of the object. The method further comprises predicting for each configuration of the multiple configurations of the object a constraint cost with regard to each constraint of one or more constraints. Furthermore, the method comprises determining for each constraint of the one or more constraints, among the predicted constraints costs that have been predicted for the multiple configurations of the object, a predicted constraint cost that meets the constraint the worst. Moreover, the method comprises predicting a target configuration of the object using the multiple configurations of the object, the one or more determined constraint costs that have been determined for the one or more constraints, and the target pose. The method comprises controlling the object to change its current state towards the predicted target configuration. The terms "meeting a constraint" and "fulfilling a constraint" may be used as synonyms.

The method according to the first aspect may be a computer-implemented method. The object may be a robot or a virtual avatar. The object may be referred to as end-effector.

The method according to the first aspect allows controlling the motion of the object towards the target pose without computing feasible trajectories leading to the target pose and without using optimization algorithms to make the target pose itself feasible. Namely, considering the one or more constraints in the form of the constraints costs allows predicting the target configuration of the object such that the predicted target configuration of the object considers the one or more constraints. Such there is no need of performing optimization algorithms in order to ensure that the predicted target configuration is feasible. Moreover, by randomizing multiple configurations of the object with regard to the current state of the object and evaluating each configuration with regard to the one or more constraints by predicting for each configuration a constraint cost with regard to each constraint, there is no need of generating feasible trajectories leading to the target pose. This reduces a time (e.g., computation time) needed for performing the method for controlling motion of the object towards the target pose.

Moreover, determining for each constraint of the one or more constraints, among the predicted constraints costs that have been predicted for the multiple configurations of the object, the predicted constraint cost that meets the constraint the worst allows reducing the amount of data used for predicting the target configuration of the object. This reduces the amount of data that need to be processed when performing the method and, thus, allows increasing the speed for executing the method. This supports a real-time execution of the method for controlling the motion of the object.

In the light of the above, the method of the first aspect allows finding a target configuration of the object that fulfils a dynamic set of constraints in real-time. Since the target configuration is predicted using the target pose, controlling the object to change its current state towards the predicted target configuration allows controlling the motion of the object towards the target pose, i.e., in the direction of the target pose.

Moreover, the method allows fulfilling a set of one or more constraints to be fulfilled while controlling the movement of the object towards the target pose. The term "movement" may be used as a synonym for the term "motion". Since the prediction of the constraint costs for the multiple configurations and determination for each constraint of the one or more constraints, among the predicted constraints costs that have been predicted for the multiple configurations of the object, of the predicted constraint cost that meets the constraint the worst do not need to consider the target pose, a change of the target pose may be considered fast and, thus, in real-time during the control of the motion of the object towards the target pose. The target pose is used for predicting the target configuration of the object. Thus, merely the prediction of the target configuration without the aforementioned steps of predicting constraints costs and determining worst constraint cost(s) are to be repeated in case the target pose changes. That is, the constraint costs do not have to be updated when only the target pose changes. This, improves speed of controlling motion of the object towards the target pose and, thus, allows a real-time control, e.g., predicting the target configuration of the object with a rate that is greater than 100 Hz on a typical computer.

Moreover, when the current state of the object changes in that the current configuration of the object changes, the constraint costs do not necessarily need to be predicted again. That is, the step of predicting for each configuration of the multiple configurations a constraint cost with regard to each constraint does not necessarily need to be performed again. The reasons for this are that the constraint costs are predicted for the randomized multiple configuration, not the actual real configuration of the object. Thus, if the object (e.g., a change of the current configuration of the object) stays within the space of the multiple configurations, the target configuration of the object may be predicted using the constraint costs that have been already predicted for the multiple configurations of the object.

Since the method of the first aspect allows a real-time control of the motion of the object towards the target pose for the reasons outlined above, the method allows a teleoperated control of the motion of the object towards the target pose. The method of the first aspect allows controlling the target pose by an operator via teleoperation. The terms "user" and "operator" may be used as synonyms.

Randomizing multiple configurations of the object with regard to the current state of the object allows the method to remain responsive to an operator input that changes the target pose. For example, when the operator moves the target pose, this should lead to a direct movement of the object in that direction (if the movement is possible). The method allows this by not evaluating a single possible configuration of the object for predicting the target configuration of the object, which leads to the target pose, but instead evaluating multiple configurations that are randomized with regard to the current state of the object. In doing this, indirectly a manifold of possible trajectories towards the target pose may be generated when performing the method at repeating time steps, i.e., when iteratively performing the method. The operator can then freely move along the manifold until the target pose and manifold are updated again. The manifold of solutions may be constantly updated to reflect changed constraints.

The dependent aspects define further advantageous embodiments of the disclosure.

The control unit according to the second aspect for controlling motion of an object towards a target pose is configured to determine a current state of the object; and randomize multiple configurations of the object with regard to the current state of the object. The control unit is configured predict for each configuration of the multiple configurations of the object a constraint cost with regard to each constraint of one or more constraints. The control unit is configured to determine for each constraint of the one or more constraints, among the predicted constraints costs that have been predicted for the multiple configurations of the object, a predicted constraint cost that meets the constraint the worst. The control unit is configured to predict a target configuration of the object using the multiple configurations of the object, the one or more determined constraint costs that have been determined for the one or more constraints, and the target pose. The control unit is configured to control the object to change its current state towards the predicted target configuration.

In other words, the control unit of the second aspect is configured to perform the method of the first aspect.

A robot according to the third aspect comprises a control unit, wherein the control unit is configured to control motion of the robot towards a target pose by determining a current state of the robot; randomizing multiple configurations of the robot with regard to the current state of the robot; predicting for each configuration of the multiple configurations of the robot a constraint cost with regard to each constraint of one or more constraints; determining for each constraint of the one or more constraints, among the predicted constraints costs that have been predicted for the multiple configurations of the robot, a predicted constraint cost that meets the constraint the worst; predicting a target configuration of the robot using the multiple configurations of the robot, the one or more determined constraint costs that have been determined for the one or more constraints, and the target pose; and controlling the robot to change its current state towards the predicted target configuration.

In other words, the robot according to the third aspect comprises a control unit of the second aspect, wherein the control unit is configured to control the motion of the robot, i.e., the object of which the motion is controllable by the control unit is the robot.

The program according to the fourth aspect comprises program-code means for executing a method for controlling motion of an object towards a target pose, when the program is executed on a computer or digital signal processor. The method comprises determining a current state of the object; and randomizing multiple configurations of the object with regard to the current state of the object. The method comprises predicting for each configuration of the multiple configurations of the object a constraint cost with regard to each constraint of one or more constraints. The method comprises determining for each constraint of the one or more constraints, among the predicted constraints costs that have been predicted for the multiple configurations of the object, a predicted constraint cost that meets the constraint the worst. The method comprises predicting a target configuration of the object using the multiple configurations of the object, the one or more determined constraint costs that have been determined for the one or more constraints, and the target pose. The method comprises controlling the object to change its current state towards the predicted target configuration.

In other words, the program according to the fourth aspect comprises program-code means for executing the method according to the first aspect, e.g., operations according to one of the embodiments of the method according to the first aspect, when the program is executed on a computer or digital signal processor.

The non-transitory computer-readable storage medium according to the fifth aspect embodies a program of machine-readable instructions executable by a digital processing apparatus, which cause the digital processing apparatus to perform a method for controlling motion of an object towards a target pose. The method comprises determining a current state of the object; and randomizing multiple configurations of the object with regard to the current state of the object. The method comprises predicting for each configuration of the multiple configurations of the object a constraint cost with regard to each constraint of one or more constraints. The method comprises determining for each constraint of the one or more constraints, among the predicted constraints costs that have been predicted for the multiple configurations of the object, a predicted constraint cost that meets the constraint the worst. The method comprises predicting a target configuration of the object using the multiple configurations of the object, the one or more determined constraint costs that have been determined for the one or more constraints, and the target pose. The method comprises controlling the object to change its current state towards the predicted target configuration.

In other words, the non-transitory computer-readable storage medium according to the fifth aspect embodies a program of machine-readable instructions executable by a digital processing apparatus, which cause the digital processing apparatus to perform the method according to the first aspect, e.g., operations according to one of the embodiments of the method according to the first aspect.

The program according to the fifth aspect includes program-code means for executing the steps according to one of the embodiments of the method according to the first aspect, when the program is executed on a computer or digital signal processor.

According to the fifth aspect, a non-transitory computer-readable storage medium embodies a program of machine-readable instructions executable by a digital processing apparatus, which cause the digital processing apparatus to perform operations according to one of the embodiments of the method according to the first aspect.

The indefinite article "a" or "an" does not exclude a plurality. A single element or other unit may fulfill the functions of several entities or items recited in the claims. The mere fact that different dependent claims recite certain measures and features of the converter circuit does not exclude that a combination of these measures and features cannot be combined in an advantageous implementation.

What is claimed is:

1. A method for controlling motion of an object towards a target pose, wherein the method comprises:
    determining a current state of the object;
    randomizing multiple configurations of the object with regard to the current state of the object;
    predicting for each configuration of the multiple configurations of the object a constraint cost with regard to each constraint of one or more constraints;
    determining for each constraint of the one or more constraints, among the predicted constraints costs that have been predicted for the multiple configurations of the object, a predicted constraint cost that meets the constraint the worst;
    predicting a target configuration of the object using the multiple configurations of the object, the one or more determined constraint costs that have been determined for the one or more constraints, and the target pose; and
    controlling the object to change its current state towards the predicted target configuration.

2. The method according to claim 1, wherein predicting for each configuration of the multiple configurations of the object the constraint cost with regard to each constraint of the one or more constraints comprises:
    using a current environmental state around the object for predicting for each configuration of the multiple configurations of the object the constraint cost.

3. The method according to claim 1, wherein
    the method is performed with regard to multiple constraints.

4. The method according to claim 1, wherein predicting for each configuration of the multiple configurations of the object the constraint cost with regard to each constraint of the one or more constraints comprises:
    generating a value for the constraint cost that is smaller than or equal to zero in case the configuration of the object meets the constraint, wherein the smaller the value the more the configuration of the object meets the constraint; and
    generating a positive value for the constraint cost in case the configuration of the object does not meet the constraint, wherein the greater the positive value the less the configuration of the object meets the constraint.

5. The method according to claim 4, wherein determining for each constraint of the one or more constraints, among the predicted constraints costs that have been predicted for the multiple configurations of the object, the predicted constraint cost that meets the constraint the worst comprises:
    determining for each constraint of the one or more constraints, among the predicted constraints costs that have been predicted for the multiple configurations of the object, the predicted constraint cost with the greatest value.

6. The method according to claim 1, wherein the method comprises:
    setting the one or more constraints according to a task to be performed by the object.

7. The method according to claim 1, wherein the method comprises:
    selecting, according to a task to be performed by the object, the one or more constraints from a plurality of constraints.

8. The method according to claim 1, wherein predicting for each configuration of the multiple configurations of the object the constraint cost with regard to each constraint of the one or more constraints comprises:
    using a neural network for each constraint of the one or more constraints that predicts for each configuration of the multiple configurations of the object the constraint cost with regard to the constraint.

9. The method according to claim 1, wherein predicting the target configuration of the object using the multiple configurations of the object, the one or more determined constraint costs that have been determined for the one or more constraints, and the target pose comprises:
    using a neural network that predicts the target configuration based on the multiple configurations of the object, the one or more determined constraint costs that have been determined for the one or more constraints, and the target pose.

10. The method according to claim 1, wherein the target pose is controlled by an operator via teleoperation.

11. The method according to claim 1, wherein the one or more constraints comprise at least one of one or more constraints due to a hardware of the object, one or more constraints due to a task to be performed by the object, and one or more constraints due to an environment around the object.

12. The method according to claim 11, wherein the one or more constraints due to the hardware of the object comprise at least one of considering one or more joint limits of the object, considering one or more speed limits of the object, considering one or more energy consumption limits of the object, and considering reachability of the object.

13. The method according to claim 11, wherein the one or more constraints due to the environment around the object comprise at least one of avoiding collision with one or more obstacles, considering one or more characteristics of a surface on which the object moves, and meeting one or more safety rules of an area within the object moves.

14. The method according to claim 1, wherein the one or more constraints comprise at least one of one or more constant constraints and one or more dynamic constraints.

15. The method according to claim 1, wherein the steps of the method are performed at repeating time steps.

16. The method according to claim 1, wherein the object is a robot or a virtual avatar.

17. A control unit for controlling motion of an object towards a target pose, wherein the control unit is configured to
determine a current state of the object;
randomize multiple configurations of the object with regard to the current state of the object;
predict for each configuration of the multiple configurations of the object a constraint cost with regard to each constraint of one or more constraints;
determine for each constraint of the one or more constraints, among the predicted constraints costs that have been predicted for the multiple configurations of the object, a predicted constraint cost that meets the constraint the worst;
predict a target configuration of the object using the multiple configurations of the object, the one or more determined constraint costs that have been determined for the one or more constraints, and the target pose; and
control the object to change its current state towards the predicted target configuration.

18. A robot comprising a control unit, wherein the control unit is configured to control motion of the robot towards a target pose by
determining a current state of the robot;
randomizing multiple configurations of the robot with regard to the current state of the robot;
predicting for each configuration of the multiple configurations of the robot a constraint cost with regard to each constraint of one or more constraints;
determining for each constraint of the one or more constraints, among the predicted constraints costs that have been predicted for the multiple configurations of the robot, a predicted constraint cost that meets the constraint the worst;
predicting a target configuration of the robot using the multiple configurations of the robot, the one or more determined constraint costs that have been determined for the one or more constraints, and the target pose; and
controlling the robot to change its current state towards the predicted target configuration.

19. A program comprising program-code means for executing a method for controlling motion of an object towards a target pose, when the program is executed on a computer or digital signal processor, wherein the method comprises:
determining a current state of the object;
randomizing multiple configurations of the object with regard to the current state of the object;
predicting for each configuration of the multiple configurations of the object a constraint cost with regard to each constraint of one or more constraints;
determining for each constraint of the one or more constraints, among the predicted constraints costs that have been predicted for the multiple configurations of the object, a predicted constraint cost that meets the constraint the worst;
predicting a target configuration of the object using the multiple configurations of the object, the one or more determined constraint costs that have been determined for the one or more constraints, and the target pose; and
controlling the object to change its current state towards the predicted target configuration.

20. A non-transitory computer-readable storage medium embodying a program of machine-readable instructions executable by a digital processing apparatus, which cause the digital processing apparatus to perform a method for controlling motion of an object towards a target pose, wherein the method comprises
determining a current state of the object;
randomizing multiple configurations of the object with regard to the current state of the object;
predicting for each configuration of the multiple configurations of the object a constraint cost with regard to each constraint of one or more constraints;
determining for each constraint of the one or more constraints, among the predicted constraints costs that have been predicted for the multiple configurations of the object, a predicted constraint cost that meets the constraint the worst;
predicting a target configuration of the object using the multiple configurations of the object, the one or more determined constraint costs that have been determined for the one or more constraints, and the target pose; and
controlling the object to change its current state towards the predicted target configuration.

* * * * *